United States Patent
Agrawal et al.

(10) Patent No.: US 9,692,827 B2
(45) Date of Patent: Jun. 27, 2017

(54) SYSTEMS AND METHODS FOR PROVISIONING SENSING RESOURCES FOR MOBILE SENSOR NETWORKS

(75) Inventors: Dakshi Agrawal, Monsey, NY (US); Chatschik Bisdikian, Chappaqua, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 13/432,337

(22) Filed: Mar. 28, 2012

(65) Prior Publication Data

US 2013/0260783 A1 Oct. 3, 2013

(51) Int. Cl.
| | |
|---|---|
| *G05B 23/02* | (2006.01) |
| *H04L 29/08* | (2006.01) |
| *H04W 64/00* | (2009.01) |
| *H04W 84/18* | (2009.01) |
| *G01S 5/02* | (2010.01) |

(52) U.S. Cl.
CPC .......... *H04L 67/12* (2013.01); *H04W 64/00* (2013.01); *G01S 5/02* (2013.01); *H04L 67/125* (2013.01); *H04W 84/18* (2013.01)

(58) Field of Classification Search
CPC ............................................. B60R 16/0315
USPC .................. 340/870.03, 539.1, 521, 870.16; 342/451, 418; 455/456.1, 7; 370/345, 370/316; 702/104, 4; 709/227, 204; 714/701, 4.1; 375/150
See application file for complete search history.

(56) References Cited

U.S. PATENT DOCUMENTS

| | | | |
|---|---|---|---|
| 7,599,957 | B2 | 10/2009 | Liu et al. |
| 8,239,046 | B2 * | 8/2012 | Koehler et al. ................ 700/19 |
| 2005/0210340 | A1 * | 9/2005 | Townsend et al. ........... 714/701 |
| 2006/0176169 | A1 * | 8/2006 | Doolin et al. ................ 340/521 |
| 2006/0183485 | A1 * | 8/2006 | Mizugaki et al. ......... 455/456.1 |
| 2006/0248197 | A1 * | 11/2006 | Evans et al. .................. 709/227 |
| 2008/0212557 | A1 * | 9/2008 | Chiricescu et al. .......... 370/345 |
| 2008/0224866 | A1 * | 9/2008 | Rehman .................... 340/572.1 |
| 2009/0285154 | A1 * | 11/2009 | Gesmundo et al. .......... 370/316 |
| 2009/0303034 | A1 * | 12/2009 | Abedi ........................ 340/539.1 |
| 2010/0076714 | A1 * | 3/2010 | Discenzo .................... 702/104 |

(Continued)

FOREIGN PATENT DOCUMENTS

CN 102378217 A 3/2012

OTHER PUBLICATIONS

Chirdchoo, et al. *Sector-Based Routing Destination Location Prediction for Underwater Mobile Networks*, 2009 International Conference on Advanced Information Networking and Applications Workshops (6 pages).

(Continued)

*Primary Examiner* — Quan-Zhen Wang
*Assistant Examiner* — Israel Daramola
(74) *Attorney, Agent, or Firm* — Harrington & Smith (57) ABSTRACT

An aspect of this invention is a method that includes a computing apparatus estimating geographic locations as a function of time for each of a plurality of sensor nodes. The method further includes estimating a quality of information as a function of time for sensed data to be sensed by the plurality of sensor nodes at the estimated geographic locations; and sending the estimated quality of information as a function of time to one or more applications or consumers of the sensed data.

22 Claims, 5 Drawing Sheets

(56) References Cited

U.S. PATENT DOCUMENTS

| | | | |
|---|---|---|---|
| 2010/0083035 A1* | 4/2010 | Kim et al. | 714/4 |
| 2010/0090901 A1* | 4/2010 | Smith et al. | 342/451 |
| 2010/0194591 A1* | 8/2010 | Andarawis et al. | 340/870.16 |
| 2011/0053494 A1* | 3/2011 | Kobayakawa | 455/7 |
| 2011/0238751 A1* | 9/2011 | Belimpasakis et al. | 709/204 |
| 2012/0059578 A1* | 3/2012 | Venkatraman | 701/411 |
| 2012/0197852 A1* | 8/2012 | Dutta et al. | 707/692 |
| 2013/0234862 A1* | 9/2013 | Toth et al. | 340/870.03 |

OTHER PUBLICATIONS

Liu, et al. *Message-Efficient Location Prediction for Mobile Objects in Wireless Sensor Networks Using a Maximum Likelihood Technique*, IEEE Transactions on Computers, vol. 60, No. 6, Jun. 2011 (14 pages).

Ruan, et al. *Wireless Sensor Network Deployment in Mobile Phones Assisted Environment*, Quality of Service (IWQoS), 2010 18th International Workshop on . . . Jun. 16-18, 2010 (9 pages).

* cited by examiner

SYSTEMS AND METHODS FOR PROVISIONING SENSING RESOURCES FOR MOBILE SENSOR NETWORKS

This invention was made with Government support under Contract No.: W911NF-06-3-0001 awarded by the U.S. Army. The Government may have certain rights in this invention.

TECHNICAL FIELD

The exemplary embodiments of this invention relate generally to methods, systems and computer program products configured for provisioning sensing resources in a mobile sensor network.

BACKGROUND

Wireless sensor networks are comprised of a plurality of spatially distributed autonomous sensing devices which cooperatively monitor physical or environmental conditions, such as temperature, sound, vibration, field strength, pressure, motion, or pollutants at different locations. Each sensor is configured to collect, process, and store environmental information as well as communicate with other sensors via intersensor communication. In many scenarios, such as urban rescue and battlefield surveillance, a pre-deployed static sensor network is either costly or difficult to implement. Mobile nodes provide a much more flexible and practical deployment approach. Also, some applications (e.g., non-intrusive habitat study) prohibit the deployment of high density networks, but are well suited to the use of mobile nodes.

The rapid development of wireless communications and embedded microsensing technologies has facilitated the use of mobile sensor networks in our daily lives. A wide range of applications exist for mobile sensor networks, including environmental monitoring, health care, nuclear, biological, and chemical attack detection, intruder detection, field measurements, remote sensing, object tracking, unmanned ground or aerial vehicles (UGVs and UAVs), sensors mounted on vehicles such as taxis, busses, trucks, fleets, or passenger cars, as well as sensors carried by humans including handheld cameras, mobile telephones, smartphones, and GPS devices. Using wireless communication technology, it is possible to create a network of these mobile sensor platforms so that even if the individual sensors are error-prone and limited in their range, when utilized together as part of a network, the sensors are able to cover a wide geographical area and provide accurate sensing of the environment.

In many mobile sensor platforms, the number of available sensing resources is suboptimal. More specifically, the number of available sensing devices, as well as the available wireless bandwidth, are both less than what is optimally needed to implement various ongoing tasks or missions. In these situations, the problem of resource allocation naturally arises wherein one potential solution is to dedicate certain sensing resources, such as sensors or sensor platforms, to a particular mission or task so that the overall allocation of sensing resources to the missions maximizes a utility function.

Currently, sensor-enabled applications assume a rather static relationship between applications and sensor platforms. Either the applications are statically bound to their sensors such that applications and sensors are deployed which are already bound to one another, or the sensors are static, or both. In both situations, the sensors are dedicated to a "region of interest" which the sensors monitor on behalf of applications for a prescribed period of time. This prescribed period of time could be infinite, i.e., forever. These sensors monitor for events and respond to their applications whenever events of interest occur. Current sensor systems cannot adequately cope with mobile operational environments which, because of their mobile nature, may cover large areas and thus require deployment of an undesirably large number of sensors.

SUMMARY

In one aspect thereof the exemplary embodiments of this invention provide a method that includes a computing apparatus estimating geographic locations as a function of time for each of a plurality of sensor nodes; estimating a quality of information as a function of time for sensed data to be sensed by the plurality of sensor nodes at the estimated geographic locations; and sending the estimated quality of information as a function of time to one or more applications or consumers of the sensed data.

In another aspect thereof, the exemplary embodiments provide a computer-readable memory that contains computer program instructions, where the execution of the computer program instructions by at least one data processor results in performance of operations that comprise estimating geographic locations as a function of time for each of a plurality of sensor nodes; estimating a quality of information as a function of time for sensed data to be sensed by the plurality of sensor nodes at the estimated geographic locations; and sending the estimated quality of information as a function of time to one or more applications or consumers of the sensed data.

In yet another aspect thereof, the exemplary embodiments provide a data processing system that comprises at least one data processor connected with at least one memory that stores computer program instructions for estimating geographic locations as a function of time for each of a plurality of sensor nodes; estimating a quality of information as a function of time for sensed data to be sensed by the plurality of sensor nodes at the estimated geographic locations; and sending the estimated quality of information as a function of time to one or more applications or consumers of the sensed data.

DETAILED DESCRIPTION

As mobile wireless sensing platforms are developed and refined, it is becoming increasingly less costly to perform environmental sensing of large spatiotemporal regions. Sensing platforms no longer need to be bound to applications, but rather may be tasked on demand based on dynamically expressed application needs. Illustrative examples of application needs include "let me know what happens in Area A for the next ten minutes" or "let me know what happened during a time interval with a starting time of 10:30 AM last Tuesday and an ending time of 8:45 PM last Wednesday". Whereas traditional sensor networks have utilized dedicated deployment of sensors with statically bound resources, practical deployments of wireless sensing platforms represent a balance between the economies of scale and flexibility allowed by mobile sensing, on the one hand, and unpredictable sensing, communication, and computing resource availability to collect, transport, and process the required sensor data, on the other. This balance will impact the quality of information (QoI) produced by mobile sensing enabled solutions.

Figure 1:
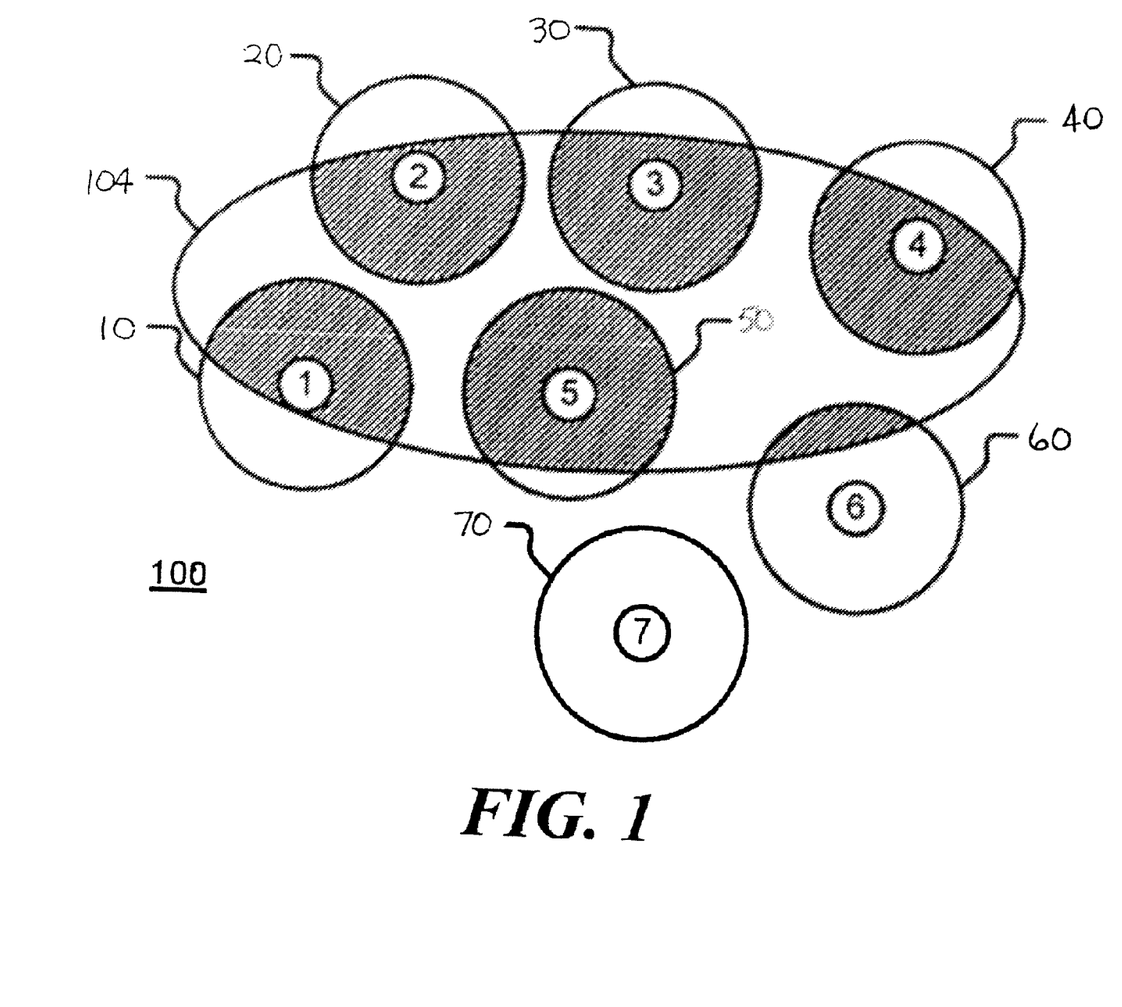
FIG. 1 is a diagram of an exemplary sensor field that includes a mobile sensor network and an event area.

FIG. 1 is a diagram of an exemplary sensor field system 100 in which a set of mobile wireless sensor nodes are deployed. The set of mobile wireless sensor nodes includes a first sensor node 1, a second sensor node 2, a third sensor node 3, a fourth sensor node 4, a fifth sensor node 5, a sixth sensor node 6 and a seventh sensor node 7. The first sensor node 1 has a corresponding first sensing area 10, the second sensor node 2 has a corresponding second sensing area 20, the third sensor node 3 has a corresponding third sensing area 30, the fourth sensor node 4 has a corresponding fourth sensing area 40, the fifth sensor node 5 has a corresponding fifth sensing area 50, the sixth sensor node 6 has a corresponding sixth sensing area 60, and the seventh sensor node 7 has a corresponding seventh sensing area 70.

Although the first, second, third, fourth, fifth, sixth, and seventh sensing areas 10, 20, 30, 40, 50, 60 and 70 are all shown as substantially circular areas, this is solely for purposes of illustration, as the sensing areas may be of any shape, and moreover, the sensing areas need not all be identical. In practice, the extent of the sensing areas 10, 20, 30, 40, 50, 60, and 70 may depend upon several parameters such as the sensor design and operational characteristics, the physics of the sensed phenomena, the topology of the area senses, the strength, concentration or quantity of the parameter being measured. An event area 104 defines an area in which one or more events or parameters are to be sensed. The first through seventh sensor nodes 1-7 may be engaged in intermittent, continuous, repeated, or periodic motion throughout the sensor field system 100. In the example of FIG. 1, the first through sixth sensor nodes 1-6 are positioned so as to sense one or more events in the event area 104, whereas it may be assumed that the seventh sensor node 7 has temporarily moved outside of the event area 104. Optionally, any of the sensor nodes 1-7 may be moved from a first geographic location to a second geographic location by remote control, such that the geographic location of the sensor node is changed in response to data or control signals received over a wireless communications link.

Figure 2:
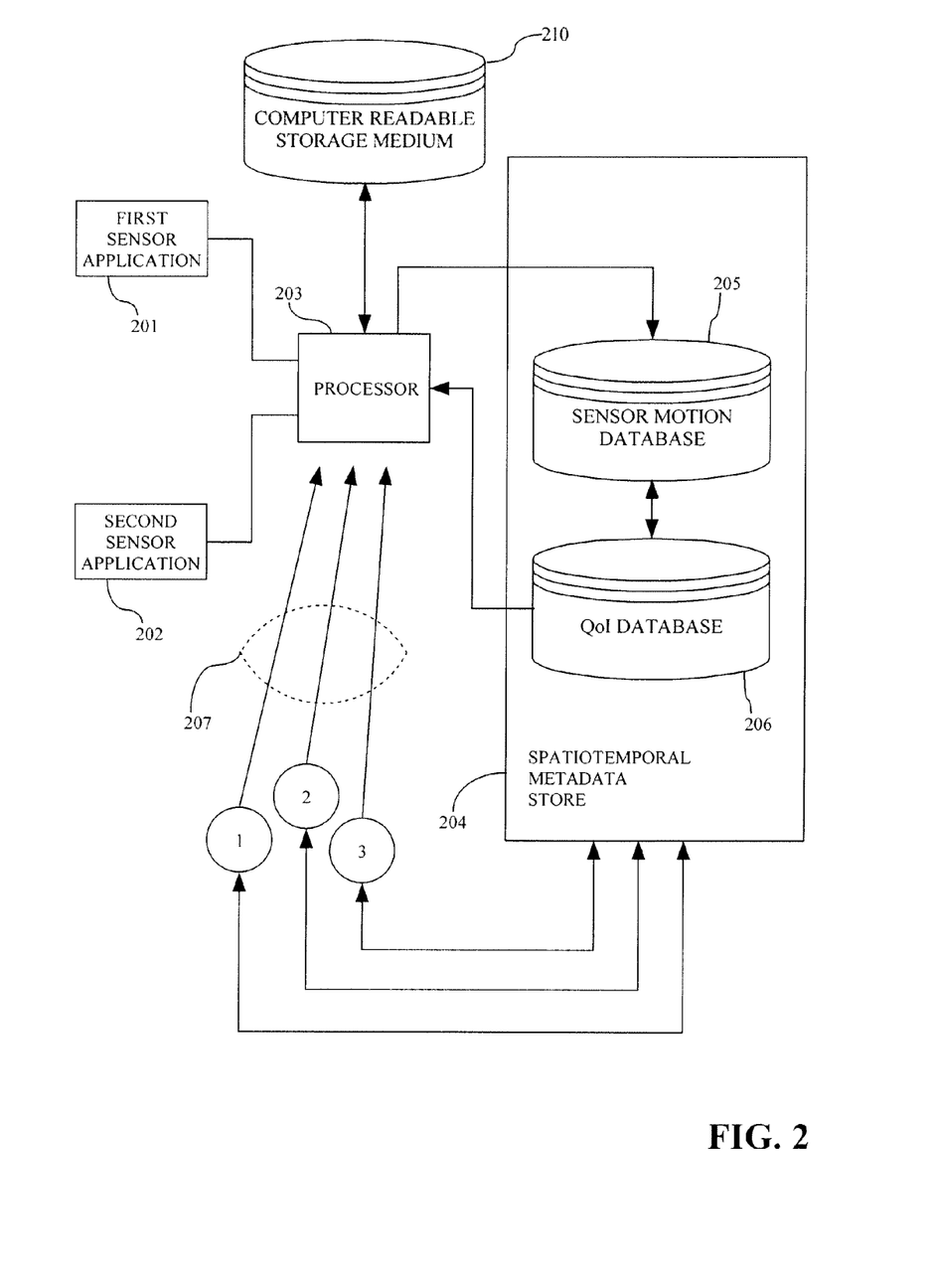
FIG. 2 illustrates a block diagram of an exemplary system in which various exemplary embodiments of the invention may be implemented.

FIG. 2 illustrates a block diagram of an exemplary system in which various exemplary embodiments of the invention may be implemented. A processor 203 is implemented using at least one computer or data processor such as a server, a workstation-type device, a personal computer-type device, a main frame type device, or another type of device that includes one or more microprocessors or microcontrollers. The processor 203 is operatively coupled to a computer readable storage medium 210 for storing computer program instructions. The computer readable storage medium 210 is a memory device or memory system. Execution of the computer program instructions stored in the computer readable storage medium 210 results in the performance of methods in accordance with this invention. For example, the processor 203 is equipped with prediction capabilities that provide an estimate of sensing resource availability for a plurality of sensor nodes such as the first, second, and third sensor nodes 1-3 shown in FIGS. 1 and 2.

The first, second, and third sensor nodes 1-3 are each configured to provide sensed data 207 (FIG. 2). The sensed data 207 is received by the processor 203. The processor 203 is configured to make adjustments to the sensor field system 100 of FIG. 1 to improve the quality of information (QoI) provided by the system, and also to provide one or more notifications of QoI capabilities for the sensor field system 100. These notifications of QoI capabilities effectively warn one or more sensor applications, such as a first sensor application 201 (FIG. 2) or a second sensor application 202, of QoI expectations. The processor 203 is configured to send information about an estimated QoI level and an attained QoI level to the first sensor application 201 and the second sensor application 202. The first sensor application 201 and the second sensor application 202 are each configured to send one or more reports to the processor that include a specification of desired sensed data 207 within a specified or defined area of the sensor field system 100 (FIG. 1), such as within the first sensing area 10, wherein the sensed data 207 (FIG. 2) has been collected during a specified time interval or period of time. For example, the report may include all activity in the second sensing area 20 (FIG. 1) from 9:30 PM to 9:50 PM. The first sensor application 201 and the second sensor application 202 each receive sensed data based on what data these applications request (for example, in the form of a specification of desired data) from one or more areas of interest. These areas of interest may or may not coincide with the coverage area of any specific sensor. In practice, if a sensor network comprising the sensor field system 100 is controllable, then the configuration of the sensor network may be controlled to arrange as best as possible the sensors to cover the areas of interest, so as to obtain or to approach a desired level of QoI over the time intervals in which each of the applications have expressed an interest. Or, if the sensor network is not controllable, predictions are made of what will be the QoI derived from these sensors estimated to be covering the region of interest over the time periods of interest.

A spatiotemporal metadata store 204 (FIG. 2) includes a sensor motion database 205 and a QoI database 206. The QoI database 206 stores QoI capability information for a plurality of sensor nodes such as the first, second, and third sensor nodes 1-3. The sensor motion database 205 stores geographic location information for the plurality of sensor nodes. Optionally, the sensor motion database 205 stores geographic location information for each of a plurality of sensor nodes as a function of time. The processor 203 may utilize the sensor motion database 205 to determine how many, or which of, the sensor nodes 1-7 (FIG. 1) will cross paths with a desired area defined within the sensor field system 100.

The spatiotemporal metadata store 204 (FIG. 2) is a memory device or memory system. The spatiotemporal metadata store 204 and the computer readable storage medium 210 may each be implemented using separate or discrete memory devices or memory systems, or the spatiotemporal metadata store 204 and the computer-readable storage medium 210 may be combined and integrated into the same memory device or memory system. The computer readable storage medium 210 and the spatiotemporal metadata store 204 can be implemented as one or more of, for example, solid state memory including dynamic RAM and/ or static RAM, flash memory, magnetic memory including disk and/or tape, or optical memory. The computer program instructions stored on the computer readable storage medium 210 can be written in any suitable programming language and can be compiled prior to execution or executed by an interpreter.

Figure 3A:
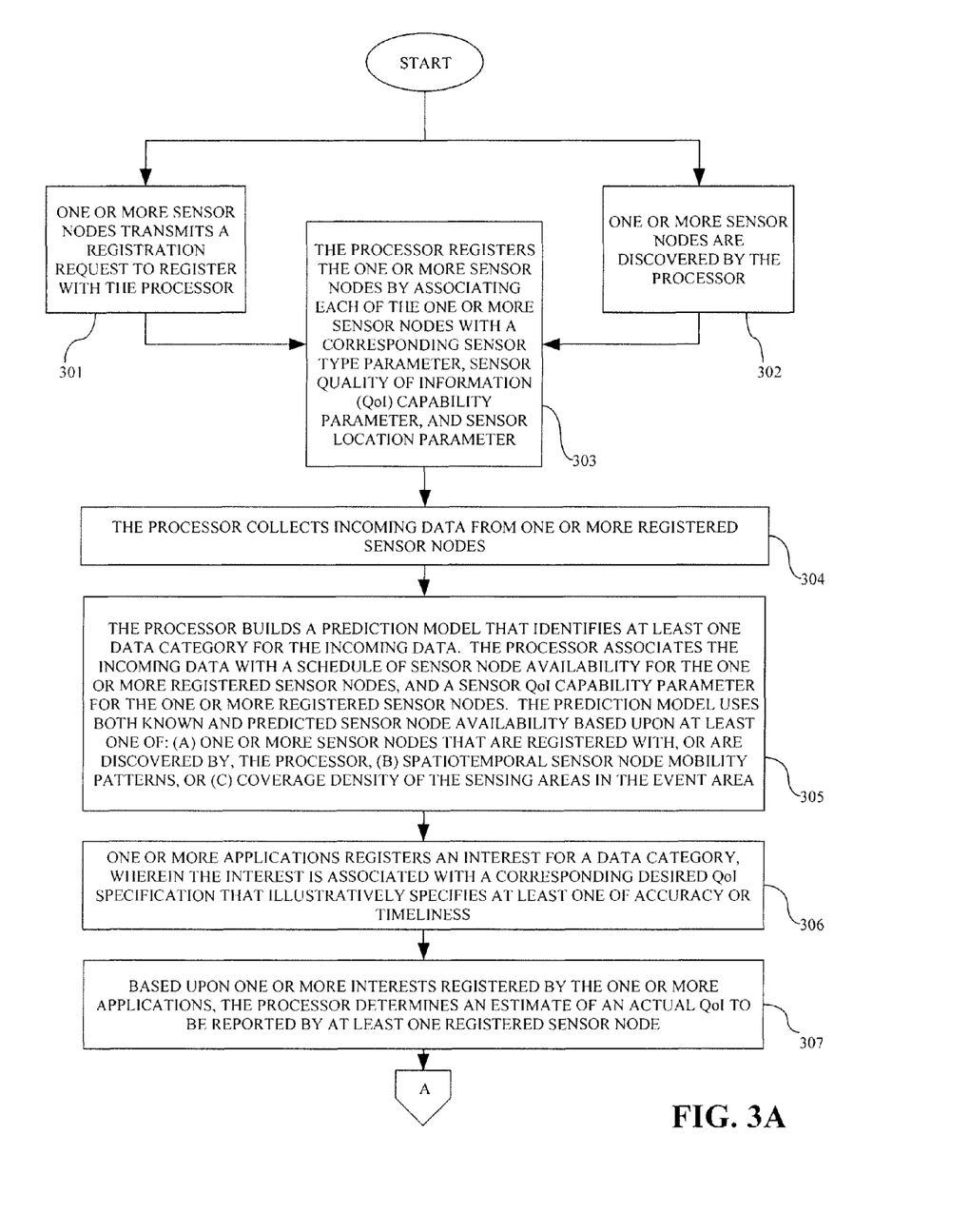
FIGS. 3A and 3B together depict a flowchart illustrating a non-limiting example of a method for practicing the exemplary embodiments of the invention.
Figure 3B:
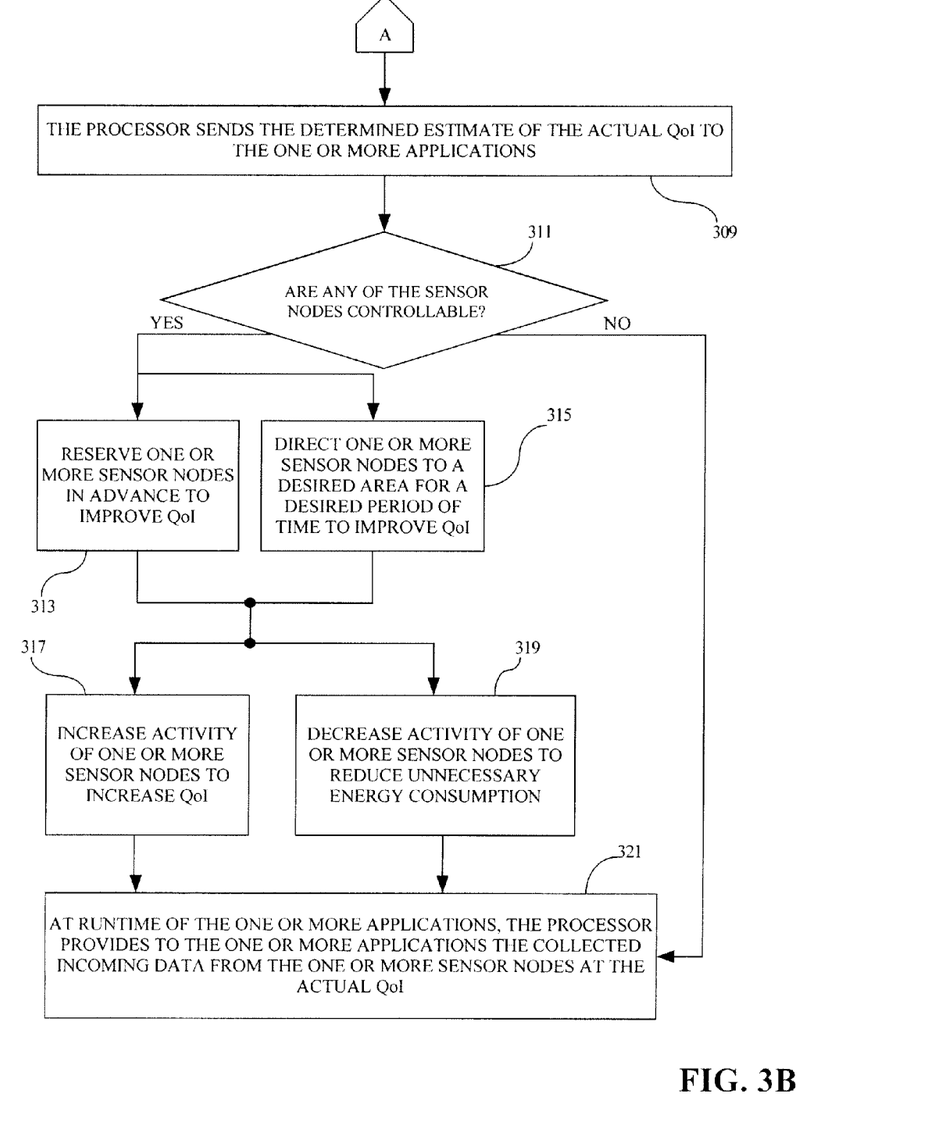

FIGS. 3A and 3B together depict a flowchart illustrating a non-limiting example of a method for practicing the exemplary embodiments of the invention. The operational sequence commences at either block 301 or block 302 of FIG. 3A. At block 301, one or more sensor nodes 1-3 (FIG. 2) transmits a registration request to register with the processor 203. At block 302 (FIG. 3A), one or more sensor nodes 1-3 (FIG. 1) are discovered by the processor 203. The operational sequence then progresses from block 301 or 302 (FIG. 3A) to block 303 where the processor 203 (FIG. 2) registers the one or more sensor nodes 1-3 by associating each of the one or more sensor nodes with a corresponding sensor type parameter, sensor quality of information (QoI) capability parameter, and sensor location parameter. The sensor type parameter may specify a type or category of data that a corresponding sensor node is configured to sense and collect, such as temperature data, motion data, wind speed data, signal strength data, or any of various other types of data. The sensor location parameter may specify current geographic coordinates for a corresponding sensor node, such as the current latitude and longitude of the sensor node. The QoI capability parameter may specify the sensing capability of a corresponding sensor node to sense a type or category of data based upon at least one of a specified level of accuracy, or within a certain range of data values, or within a certain amount of time.

At block 304 (FIG. 3A), the processor collects incoming sensed data 207 (FIG. 2) from one or more registered sensor nodes 1-3. Next, at block 305 (FIG. 3A), the processor 203 (FIG. 2) builds a prediction model that identifies at least one data category for the incoming data. The processor 203 associates the incoming data with a schedule of sensor node availability for the one or more registered sensor nodes, and a sensor QoI capability parameter for the one or more registered sensor nodes. The prediction model uses both known and predicted sensor node availability based upon at least one of: (A) one or more sensor nodes that are registered with, or discovered by, the processor 203; (B) spatiotemporal sensor node mobility patterns as a function of time; or (C) coverage density of the sensing areas 10, 20, 30, 40, 50, 60, 70 (FIG. 1) in the sensor field system 100.

The operational sequence progresses to block 306 (FIG. 3A) where one or more applications, such as the first sensor application 201 (FIG. 2) and the second sensor application 202, register an interest for a data category. The interest is associated with a desired QoI specification that illustratively specifies at least one of accuracy or timeliness. Based upon the one or more interests registered by the one or more applications, the processor 203 determines an estimate of an actual QoI to be reported by at least one registered sensor node (FIG. 3A, block 307). The processor 203 (FIG. 2) sends the determined estimate of the QoI to the one or more applications (FIG. 3B, block 309).

A decision is performed at block 311 to determine whether or not any of the sensor nodes are controllable. For example, this test may determine whether or not any of the sensor nodes 1-7 (FIG. 1) are configured to be relocated from a first geographic location to a second geographic location, or from a first position to a second position, via a remote control communications link. Alternatively or additionally, this test may determine whether or not any of the sensor nodes 1-7 can be reserved in advance for a specified time or a specified interval of time. Alternatively or additionally, this test may determine whether or not an activity level or monitoring rate for any of the sensor nodes 1-7 can be adjusted or determined by means of a remote control communications link. The negative branch from block 311 (FIG. 3B) leads to block 321 where, at runtime of the one or more applications, the processor provides to the one or more applications the collected incoming data from the one or more sensor nodes at the actual QoI.

The positive branch from block 311 leads to either block 313 or block 315. At block 313, one or more sensor nodes are reserved in advance for a specified time or a specified time interval to improve QoI. At block 315, one or more sensor nodes are directed to a desired area in the sensor field system 100 (FIG. 1) for a desired period of time to improve QoI. From block 313 or block 315 (FIG. 3B), program control progresses to either of blocks 317 or 319. At block 317, the activity level or monitoring rate of one or more sensor nodes is increased to increase QoI. At block 319, the activity level or monitoring rate of one or more sensor nodes is decreased to reduce unnecessary energy consumption. From block 317 or block 319, program control progresses to block 321 where, at runtime of the one or more applications such as the first sensor application 201 and the second sensor application 202 (FIG. 2), the processor 203 provides to the one or more applications the collected incoming sensed data 207 from the one or more sensor nodes 1-3 at the actual QoI provided by the sensor nodes 1-3.

Figure 4:
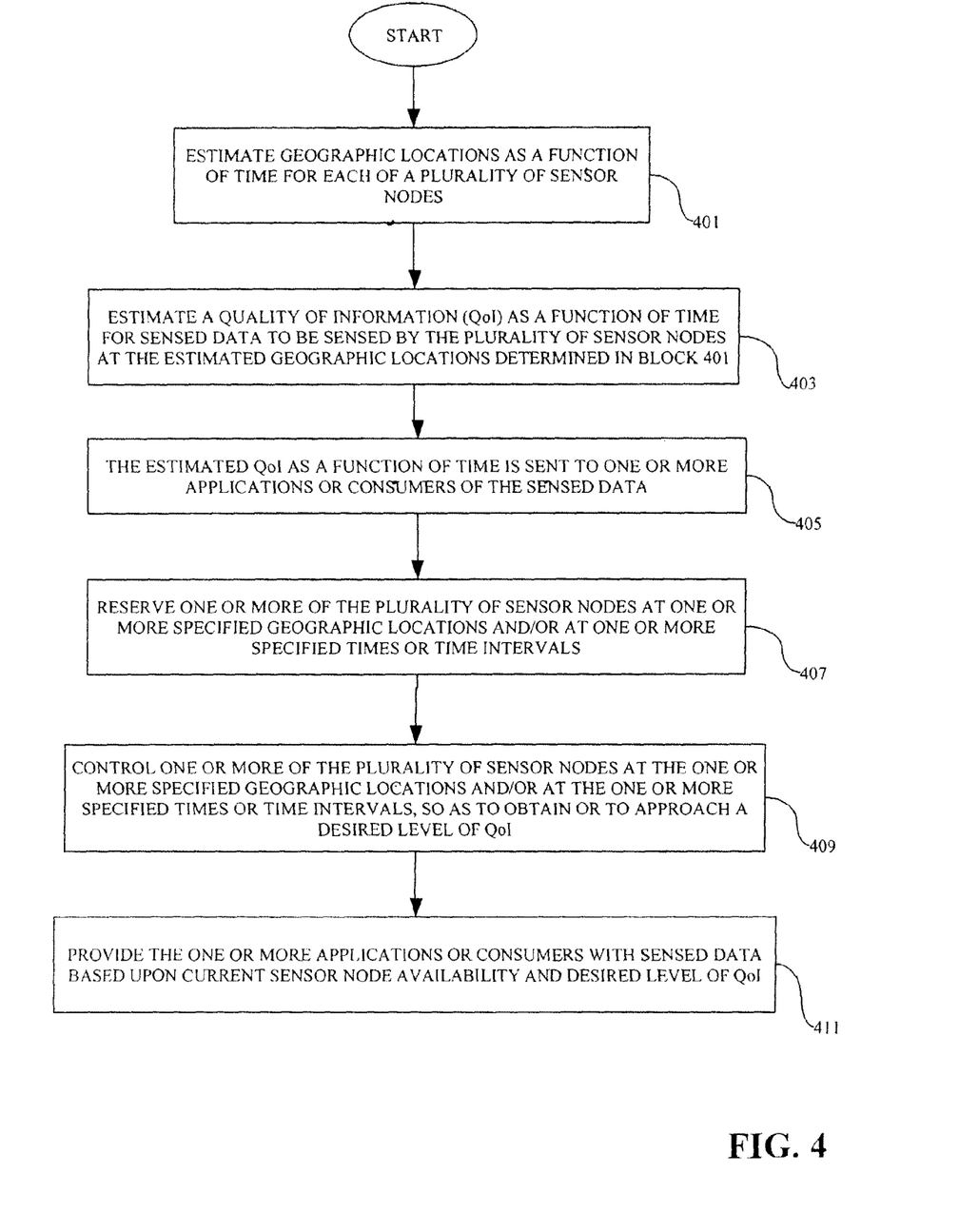
FIG. 4 depicts a flowchart illustrating another non-limiting example of a method for practicing the exemplary embodiments of the invention.

FIG. 4 depicts a flowchart illustrating another non-limiting example of a method for practicing the exemplary embodiments of the invention. The operational sequence commences at block 401 where geographic locations as a function of time are estimated for each of a plurality of sensor nodes 1-3 (FIG. 2). The program advances to block 403 (FIG. 4) where a quality of information (QoI) as a function of time is estimated for sensed data 207 (FIG. 2), wherein this sensed data is to be sensed by the plurality of sensor nodes 1-3 at the estimated geographic locations determined in block 401 (FIG. 4). At block 405, the estimated QoI as a function of time is sent to one or more applications or consumers of the sensed data 207 (FIG. 2), such as the first sensor application 201 and the second sensor application 202. Next, at block 407 (FIG. 4), one or more of the plurality of sensor nodes 1-3 (FIG. 2) are reserved at one or more specified geographic locations, and/or and at one or more specified times or time intervals. One or more of the plurality of sensor nodes 1-3 is controlled at the one or more specified geographic locations and/or at the one or more specified times or time intervals, so as to obtain or to approach a desired level of QoI (FIG. 4, block 409). At block 411, one or more applications or consumers of data, such as the first sensor application 201 (FIG. 2) and the second sensor application 202 are provided with sensed data 207.

As should be appreciated by one skilled in the art, aspects of the present invention may be embodied as a system, method, computer program product or as a combination of these. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular folios "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method comprising:
   at a computing apparatus, estimating geographic locations as a function of time for each of a plurality of sensor nodes;
   estimating a quality of information as a function of time for sensed data to be sensed by the plurality of sensor nodes at the estimated geographic locations;
   sending the estimated quality of information as a function of time to one or more applications or consumers of the sensed data; and
   at least one of:
      reserving one or more of the plurality of sensor nodes at one or more specified geographic locations; or
      reserving one or more of the plurality of sensor nodes at one or more specified times or time intervals.

2. The method of claim 1, further comprising storing the estimated geographic locations in a spatiotemporal metadata storage device.

3. The method of claim 1, further comprising controlling one or more of the plurality of sensor nodes at the one or more specified geographic locations, so as to substantially achieve a desired level of quality of information.

4. The method of claim 1, further comprising controlling one or more of the plurality of sensor nodes at one or more specified times or time intervals, so as to substantially achieve a desired level of quality of information.

5. The method of claim 1, further comprising providing the one or more applications or consumers with sensed data at an attained quality of information level based upon current sensor node availability and a desired level of quality of information.

6. The method of claim 1, further comprising directing one or more of the plurality of sensor nodes to a specified geographic area to attain a desired level of quality of information.

7. The method of claim 1, further comprising increasing sensing activity for one or more of the plurality of sensor nodes to increase an achieved level of quality of information.

8. The method of claim 1, further comprising decreasing sensing activity for one or more of the plurality of sensor nodes to reduce unnecessary energy consumption.

9. A computer-readable memory that contains computer program instructions, wherein the execution of the computer program instructions by at least one data processor results in performance of operations that comprise:
   estimating geographic locations as a function of time for each of a plurality of sensor nodes;
   estimating a quality of information as a function of time for sensed data to be sensed by the plurality of sensor nodes at the estimated geographic locations; and
   sending the estimated quality of information as a function of time to one or more applications or consumers of the sensed data; and
   at least one of:
      reserving one or more of the plurality of sensor nodes at one or more specified geographic locations; or
      reserving one or more of the plurality of sensor nodes at one or more specified times or time intervals.

10. The computer-readable memory of claim 9 wherein the computer program instructions further comprise instructions for controlling one or more of the plurality of sensor nodes at the one or more specified geographic locations, so as to substantially achieve a desired level of quality of information.

11. The computer-readable memory of claim 9 wherein the computer program instructions further comprise instructions for controlling one or more of the plurality of sensor nodes at one or more specified times or time intervals, so as to substantially achieve a desired level of quality of information.

12. The computer-readable memory of claim 9 wherein the computer program instructions further comprise instructions for providing the one or more applications or consumers with sensed data at an attained quality of information level based upon current sensor node availability and a desired level of quality of information.

13. The computer-readable memory of claim 9 wherein the computer program instructions further comprise instructions for directing one or more of the plurality of sensor nodes to a specified geographic area to attain a desired level of quality of information.

14. The computer-readable memory of claim 9 wherein the computer program instructions further comprise instructions for increasing sensing activity for one or more of the plurality of sensor nodes to increase an achieved level of quality of information.

15. The computer-readable memory of claim 9 wherein the computer program instructions further comprise instructions for decreasing sensing activity for one or more of the plurality of sensor nodes to reduce unnecessary energy consumption.

16. A data processing system that comprises at least one data processor connected with at least one memory that stores computer program instructions for:
   estimating geographic locations as a function of time for each of a plurality of sensor nodes;
   estimating a quality of information as a function of time for sensed data to be sensed by the plurality of sensor nodes at the estimated geographic locations; and
   sending the estimated quality of information as a function of time to one or more applications or consumers of the sensed data; and
   at least one of:
      reserving one or more of the plurality of sensor nodes at one or more specified geographic locations; or
      reserving one or more of the plurality of sensor nodes at one or more specified times or time intervals.

17. The data processing system of claim 16 wherein the computer program instructions further comprise instructions for controlling one or more of the plurality of sensor nodes at the one or more specified geographic locations, so as to substantially achieve a desired level of quality of information.

18. The data processing system of claim 16 wherein the computer program instructions further comprise instructions for controlling one or more of the plurality of sensor nodes at one or more specified times or time intervals, so as to substantially achieve a desired level of quality of information.

19. The data processing system of claim 16 wherein the computer program instructions further comprise instructions for providing the one or more applications or consumers with sensed data at an attained quality of information level based upon current sensor node availability.

20. The data processing system of claim 16 wherein the computer program instructions further comprise instructions for providing the one or more applications or consumers with sensed data at an attained quality of information level based upon a desired level of quality of information.

21. The data processing system of claim 16 wherein the computer program instructions further comprise instructions for at least one of:
   directing one or more of the plurality of sensor nodes to a specified geographic area to substantially achieve a desired level of quality of information; or
   increasing sensing activity for one or more of the plurality of sensor nodes to substantially achieve the desired level of quality of information.

22. The data processing system of claim 16 wherein the computer program instructions further comprise instructions for decreasing sensing activity for one or more of the plurality of sensor nodes to reduce unnecessary energy consumption.

* * * * *